US007411202B2

(12) United States Patent
Hasenour et al.

(10) Patent No.: US 7,411,202 B2
(45) Date of Patent: Aug. 12, 2008

(54) IRRADIATING APPARATUS

(75) Inventors: Benjamin W. Hasenour, St. Anthony, IN (US); James F. Arvin, Jasper, IN (US)

(73) Assignee: Dubois Equipment Company, Inc., Jasper, IN (US)

( * ) Notice: Subject to any disclaimer, the term of this patent is extended or adjusted under 35 U.S.C. 154(b) by 291 days.

(21) Appl. No.: 11/188,554

(22) Filed: Jul. 25, 2005

(65) Prior Publication Data

US 2007/0017503 A1 Jan. 25, 2007

(51) Int. Cl.
*B29C 35/02* (2006.01)

(52) U.S. Cl. ............................... 250/504 R; 250/492.1; 250/455.11; 250/493.1; 250/503.1; 355/66; 355/67; 34/277; 34/278; 347/102; 362/347; 362/341

(58) Field of Classification Search ............. 250/504 R, 250/492.1, 455.11, 493.1, 503.1; 355/66-67; 126/605; 34/277, 278; 347/102; 362/347, 362/341

See application file for complete search history.

(56) References Cited

U.S. PATENT DOCUMENTS 5,003,185 A * 3/1991 Burgio, Jr. .............. 250/504 R
5,861,633 A * 1/1999 Mandellos .............. 250/504 R
5,988,836 A * 11/1999 Swarens ...................... 362/364
6,242,717 B1 * 6/2001 Sanderson .................. 219/405
6,720,566 B2 * 4/2004 Blandford ............... 250/504 R
6,739,716 B2 * 5/2004 Richards ...................... 347/102
6,841,790 B1 * 1/2005 Phillips et al. .......... 250/504 R
6,883,936 B2 * 4/2005 Register et al. ............. 362/284
7,002,170 B2 * 2/2006 Schweitzer ............. 250/504 R
2002/0118541 A1 * 8/2002 Stowell et al. .............. 362/294
2006/0266955 A1 * 11/2006 Arvin et al. .............. 250/492.1

* cited by examiner

*Primary Examiner*—Jack I. Berman
*Assistant Examiner*—Michael J Logie
(74) *Attorney, Agent, or Firm*—John R. Hoffman

(57) ABSTRACT

An irradiating apparatus includes a support member and a reflector supported by the support member to define a concave light energy reflector surface. A light source of radiating energy is disposed generally at the source focal point of the reflector. The support member has a passage for cooling air to flow therethrough and openings for distributing the cooling air to the apparatus. The support member, thereby, performs a dual function of supporting the reflector as well as providing a manifold for the cooling air.

25 Claims, 11 Drawing Sheets

IRRADIATING APPARATUS

FIELD OF THE INVENTION

This invention generally relates to the art of irradiating apparatus, such as an apparatus for curing a curable coating on an object.

BACKGROUND OF THE INVENTION

Light energy irradiators or reflectors have been used for providing intense energy radiation in a wide range of applications. For instance, ultraviolet (UV) irradiators have been used in the curing of polymers such as photopolymer paints, the curing of inks and a variety of finishing coatings, the photo activation of adhesives, varied uses in the graphic arts and other areas in research and manufacturing. Curing is produced by a polymerization reaction initiated by ultraviolet light, changing a component of the coating from a liquid to a solid state almost instantaneously. A UV lamp or other light source can be used in such a manner to be supported adjacent a reflecting surface which is configured to provide a focused reflection of the light. When used for curing, a reflector system may have an elliptical profile reflector surface to provide a focused optical configuration wherein the light energy is concentrated into a narrow band of energy on the curing surface. Typically, because of the speed of curing, elliptical reflectors are used in systems wherein the object having a curable coating, for instance, is carried past the concentrated light band on a conveyor or other advancing conveying means.

One of the problems with irradiating apparatus of the character described above, which use intense energy radiation emanating from a UV lamp, for instance, or other light source, is that the source of energy radiation can develop considerable heat. This heat either must be dissipated or the apparatus must be cooled by some means causing air flow through or about the apparatus. For instance, a typical irradiator, such as a UV reflector, includes a rather bulky housing through which air or any other cooling medium flows to facilitate cooling the apparatus. The housing adds to the size, complexity and cost of the apparatus and results in the apparatus simply being a bulky and cumbersome structure. The present invention is directed to solving these problems by providing an irradiator or reflector with means for cooling the apparatus in an extremely streamlined and very cost effective structure.

SUMMARY OF THE INVENTION

An object, therefore, of the invention is to provide a new and improved irradiating apparatus or reflector of the character described.

In the exemplary embodiment of the invention, an apparatus is disclosed for curing a curable coating on an object. However, it should be understood that the unique features of the inventive apparatus are equally applicable for a wide range of light energy irradiators or reflectors.

As disclosed herein, the apparatus includes an elongated support, with a plurality of ribs mounted on the elongated support and spaced longitudinally therealong. The ribs have concave contour surfaces. An elongated reflector is disposed against the concave contour surfaces of the ribs to define an open-sided light energy reflector surface. An elongated light source of radiating curing energy is disposed generally at the source focal point of the elongated reflector for curing the coating on the object. The elongated support has passage means for cooling air to flow therethrough. The passage means has openings means for distributing the cooling air along the apparatus. Therefore, the elongated support performs a dual function of supporting the ribs as well as providing a manifold for the cooling air and, thereby, eliminates all of the encasing housing structures of the prior art.

According to one aspect of the invention, the elongated support is provided by a generally hollow structure. The opening means comprise a plurality of air openings spaced longitudinally of the structure. As disclosed herein, the elongated support comprises a tube-like member, and the air openings are located between the ribs. Preferably, the air openings comprise slots in the elongated support, with the slots being elongated in the direction of the elongated support.

According to another aspect of the invention, the reflector comprises a reflector sheet. Spring means are provided to draw the reflector sheet against the contour surfaces of the ribs. As disclosed herein, the spring means comprise a plurality of spring members spaced longitudinally of the apparatus, and the spring members effectively engage edges of the reflector sheet at longitudinal edges of the open-sided reflector surface.

By providing a plurality of discrete air openings spaced along the elongated support, a number of unique and advantageous cooling schemes can be designed. For instance, the invention contemplates that the discrete openings can increase in size from opposite ends of the elongated support toward the center thereof. This scheme increases the cooling affect at the center of the irradiating apparatus where heat may be most concentrated. The invention also contemplates an opening scheme wherein the air openings decrease in size from an air inlet end of the elongated support to an opposite closed end thereof. This arrangement will facilitate maintaining a more uniform air flow along the length of the apparatus.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
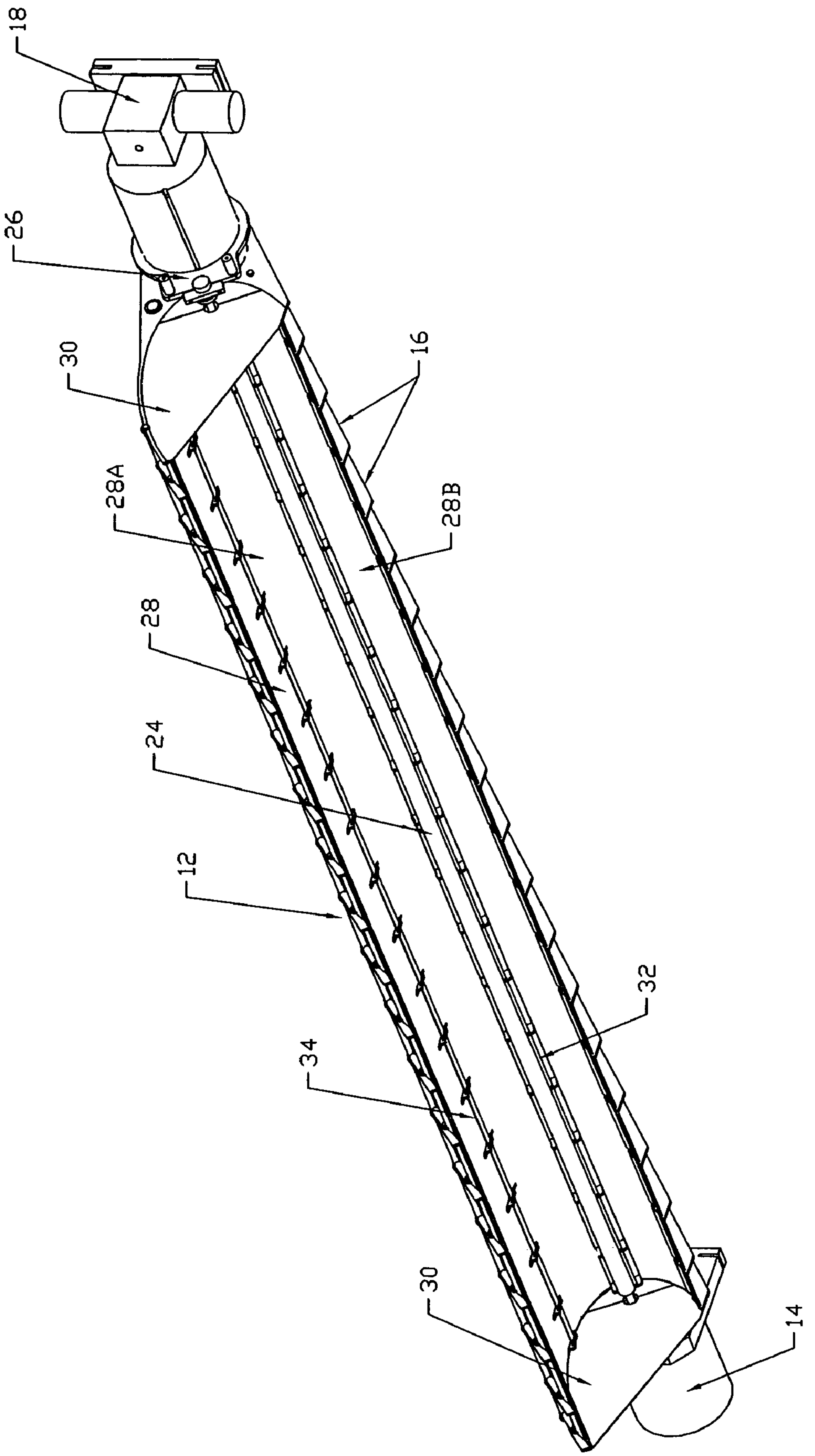
FIG. 1 is a perspective view of the irradiating apparatus or reflector of the invention, looking into the concave reflecting side thereof.
Figure 2:
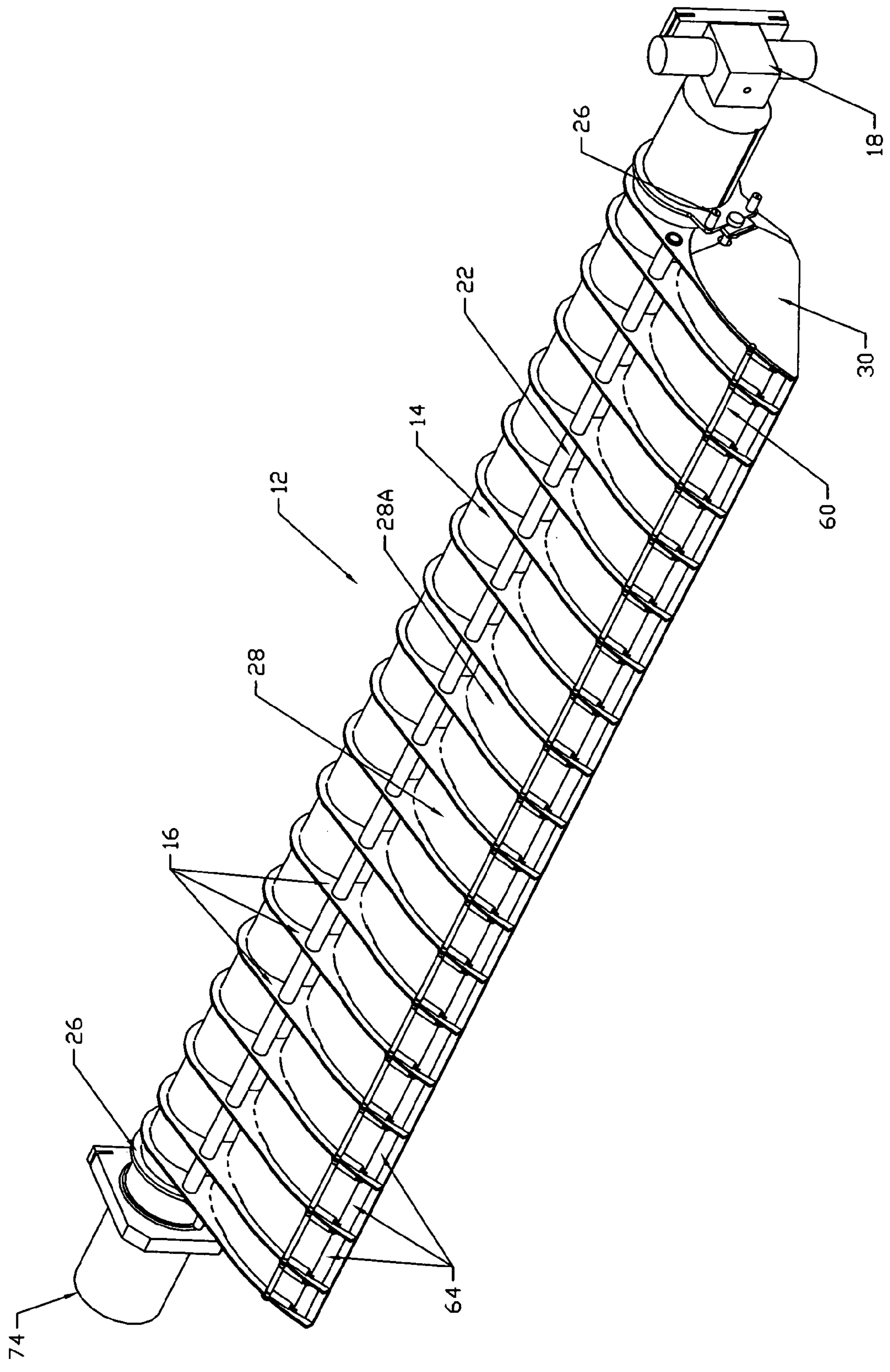
FIG. 2 is a perspective view of the apparatus, looking at the back side thereof.

Referring to the drawings in greater detail, and first to FIGS. 1 and 2, the invention is embodied in an irradiating apparatus or reflector, generally designated 12, which may be used for a wide variety of applications, such as curing a curable coating on an object. The apparatus includes an elongated support 14 having a plurality of support ribs 16 mounted to or supported by the elongated support at spaced intervals therealong. A rotary actuator 18 is disposed at one end of the apparatus for rotating the entire apparatus to change the reflecting angle thereof. A pair of proximity sensors 20 may be provided at an opposite end of the apparatus. A conduit 22 extends through the support ribs generally between opposite ends of the apparatus. The conduit simply is provided for passing electrical wires or cables therethrough and protecting the wires between the opposite ends of the apparatus. It immediately can be seen from FIG. 2 that the irradiating apparatus 12 is completely void of any surrounding housing whatsoever. Yet, it will be seen hereinafter that the apparatus is provided with a very effective and efficient cooling system.

Figure 3:
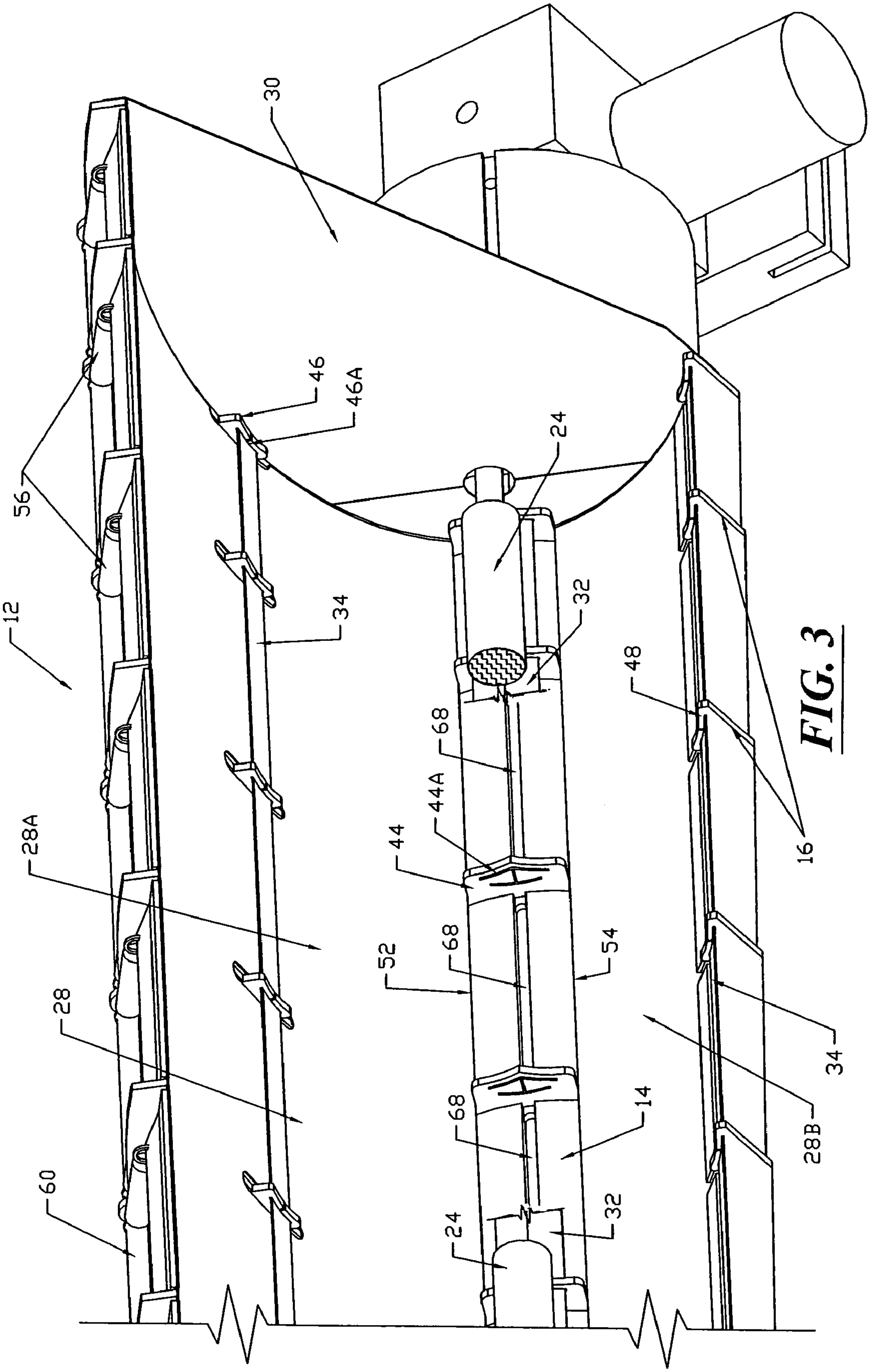
FIG. 3 is an enlarged, fragmented perspective view, partially cut-away, looking into one end of the apparatus.

Referring to FIG. 3 in conjunction with FIG. 1, an elongated light source 24 of radiating energy is mounted by a pair of brackets 26 within an open-sided, elongated concave reflector, generally designated 28, to provide a focus for radiated energy, such as curing energy onto an object. A pair of highly reflective end walls 30 are mounted at opposite ends of light source 24 and reflector 28. In an apparatus for curing a curable coating, light source 24 may be an ultraviolet (UV) light tube or lamp. Actually, the open-sided reflector 28 includes top and bottom reflector sections 28A and 28B which combine to define the composite reflector 28. The reflector is generally elliptical in cross-section for radiating energy along an energy concentration band or line which may be coincident with the object to be cured. It should be understood that the reflective surface of reflector 28 is "generally" elliptical in that a perfectly elliptical surface is not fabricationally practical. In fact, a generally reflective surface could be fabricated with many finite straight line sections. Reflector 28 herein, including reflector sections 28A and 28B, is fabricated of thin, flexible and highly reflective material.

Referring specifically to FIG. 3, a unique back reflector system is used in irradiating apparatus 12 as was disclosed in co-pending application Ser. No. 11/136,218, filed May 24, 2005, assigned to the assignee of the present invention, and which is incorporated by reference herein. Therefore, the system will not be described in significant detail herein. Suffice it to say, a back reflector 32 is provided behind light source 24 and includes a pair of side elliptical sections. The back reflector runs lengthwise along the light source, and a pair of side reflectors 34 are provided on reflector sections 28A and 28B. The surfaces of the side reflectors are generally elliptical. The back reflector, including its elliptical side sections, is effective to redirect rearwardly radiated energy from the light source onto side reflectors 34 which, in turn, reflect the energy to the energy concentration band or line.

Figure 4:
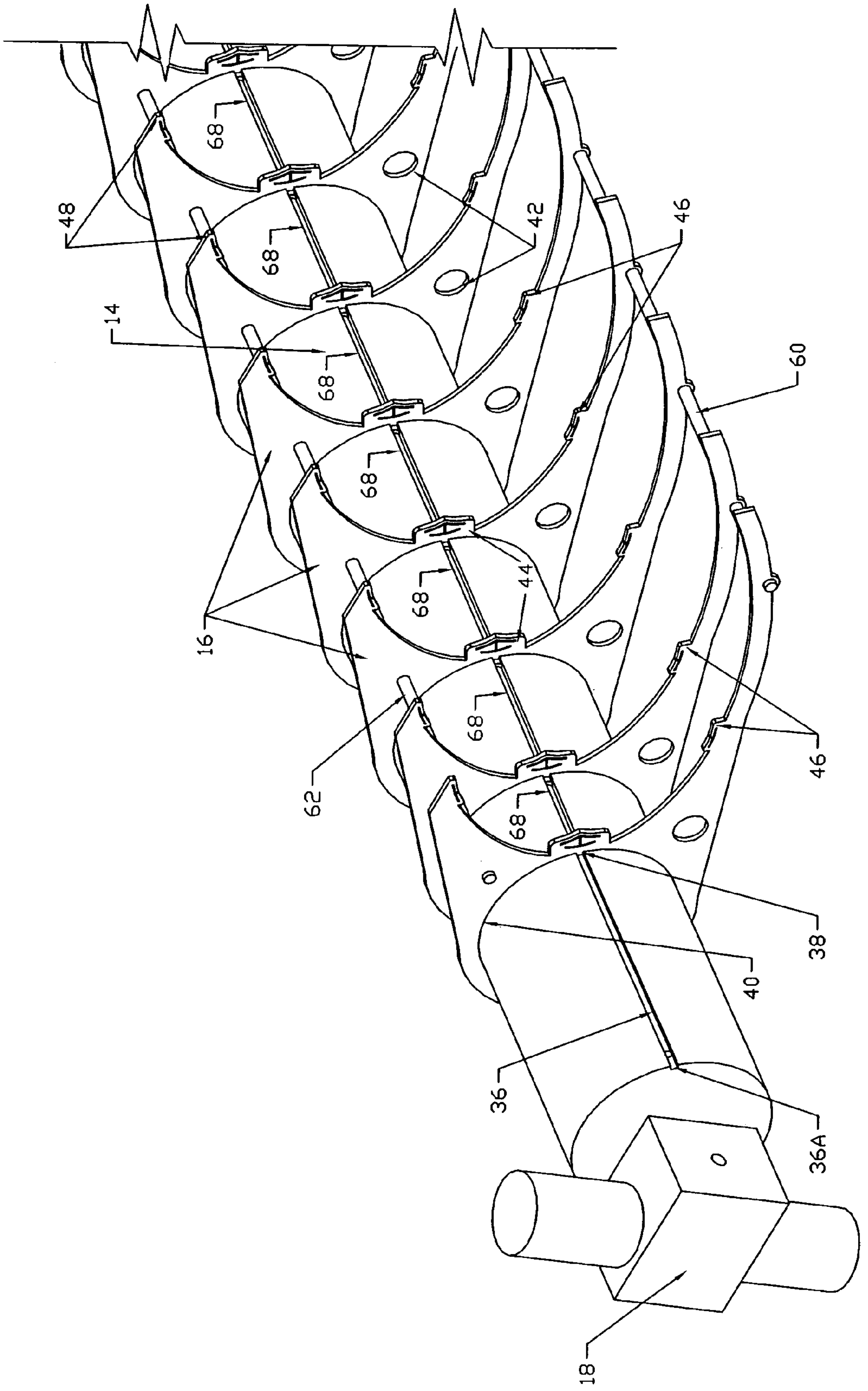
FIG. 4 is a fragmented perspective view, on an enlarged scale, showing primarily the elongated support and a plurality of the support ribs mounted thereto, and with other components of the apparatus removed to facilitate the illustration.
Figure 5:
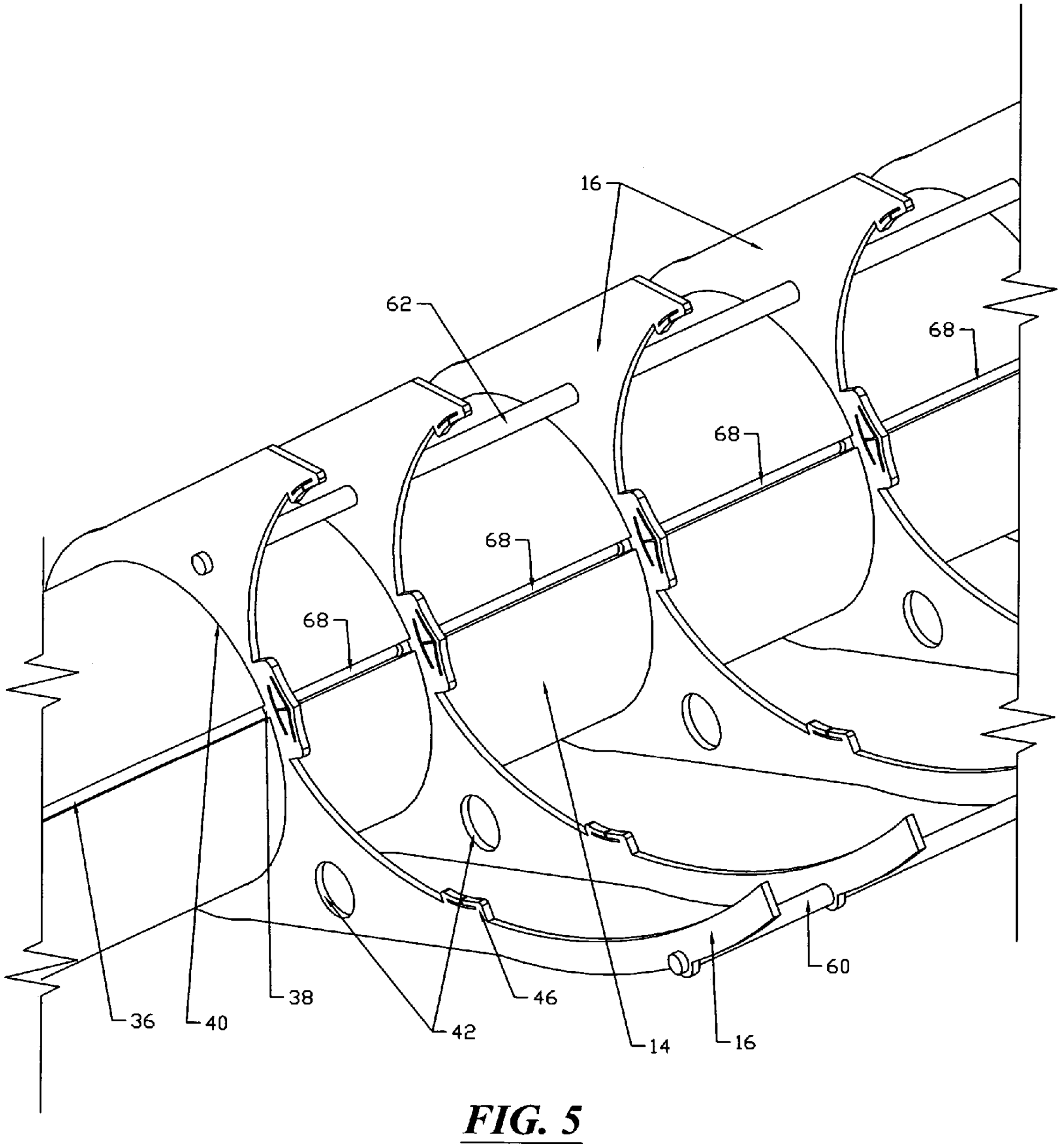
FIG. 5 is a further enlarged depiction of the elongated support and a plurality of the support ribs.

FIGS. 4 and 5 simply show a plurality of the support ribs 16 mounted to and supported by the elongated support 14. The elongated support is generally cylindrical and generally hollow and, hereinafter, will be referred to as the "support tube". The support ribs 16 are generally planar members. Both the support tube and the support ribs may be fabricated of an aluminum alloy material, for instance. A groove 36 is formed in the outside surface of support tube 14 and runs substantially the entire length thereof, with at least one end 36*a* of the groove being open as seen in FIG. 4. Each support rib 16 includes a positioning tab 38 which projects into groove 36 to precisely position or locate each individual rib and all ribs mutually at a specific angular orientation relative to support tube 14. The support ribs have a large circular hole 40 which embraces the support tube. With rotary actuator 18 removed, the support ribs can be slidably mounted onto support tube 14 from one end thereof by sliding positioning tabs 38 into open end 36*a* of groove 36 and spacing the ribs longitudinally of the support tube. The ribs also have smaller holes 42 for receiving conduit 22 (FIG. 2). By using a jig to precisely space support ribs 16 longitudinally of support tube 14, the ribs can be spot-welded to the outside of the support tube and to conduit 22. Of course, other fixing means are contemplated.

Figure 6:
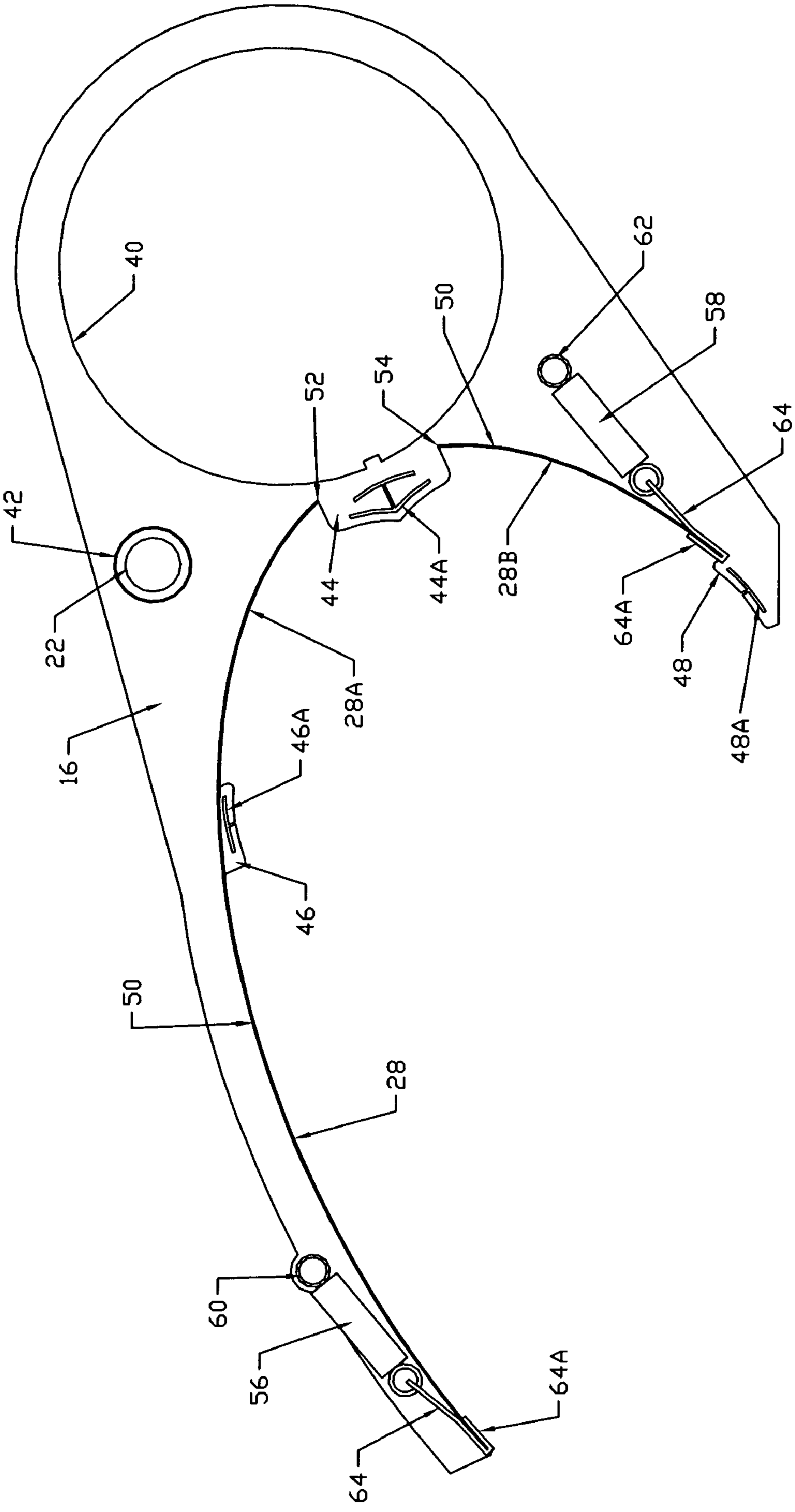
FIG. 6 is an enlarged elevational view of a single support rib, along with a pair of springs and spring clips which draw the reflector sheets into the ribs.

Referring to FIG. 6 in conjunction with FIG. 5, each support rib 16 includes a center flange 44 and a pair of side flanges 46 and 48, all of which project generally radially into the open-sided reflector 28. Center flange 44 has a slot 44*a* through which back reflector 32 (FIG. 3) extends. Side flanges 46 and 48 have slots 46*a* and 48*a*, respectively, through which side reflectors 34 extend. When the support ribs are mounted and fixed as shown in FIG. 5, the back reflector and the side reflectors can be mounted by sliding the reflectors lengthwise of the entire assembly through slots 44*a*, 46*a* and 48*a* of flanges 44, 46 and 48, respectively. FIG. 6 also shows that reflector sections 28A and 28B engage against concave contour surfaces 50 of ribs 16. As stated above for the geometry of reflector 28, contour surfaces 50 of ribs 16 form a generally elliptical configuration for reflector 28. FIG. 6 shows that reflector section 28B is sandwiched between center flange 44 and side flange 48. Reflector section 28A abuts center flange 44 and has holes through which side flanges 46 project.

Figure 7:
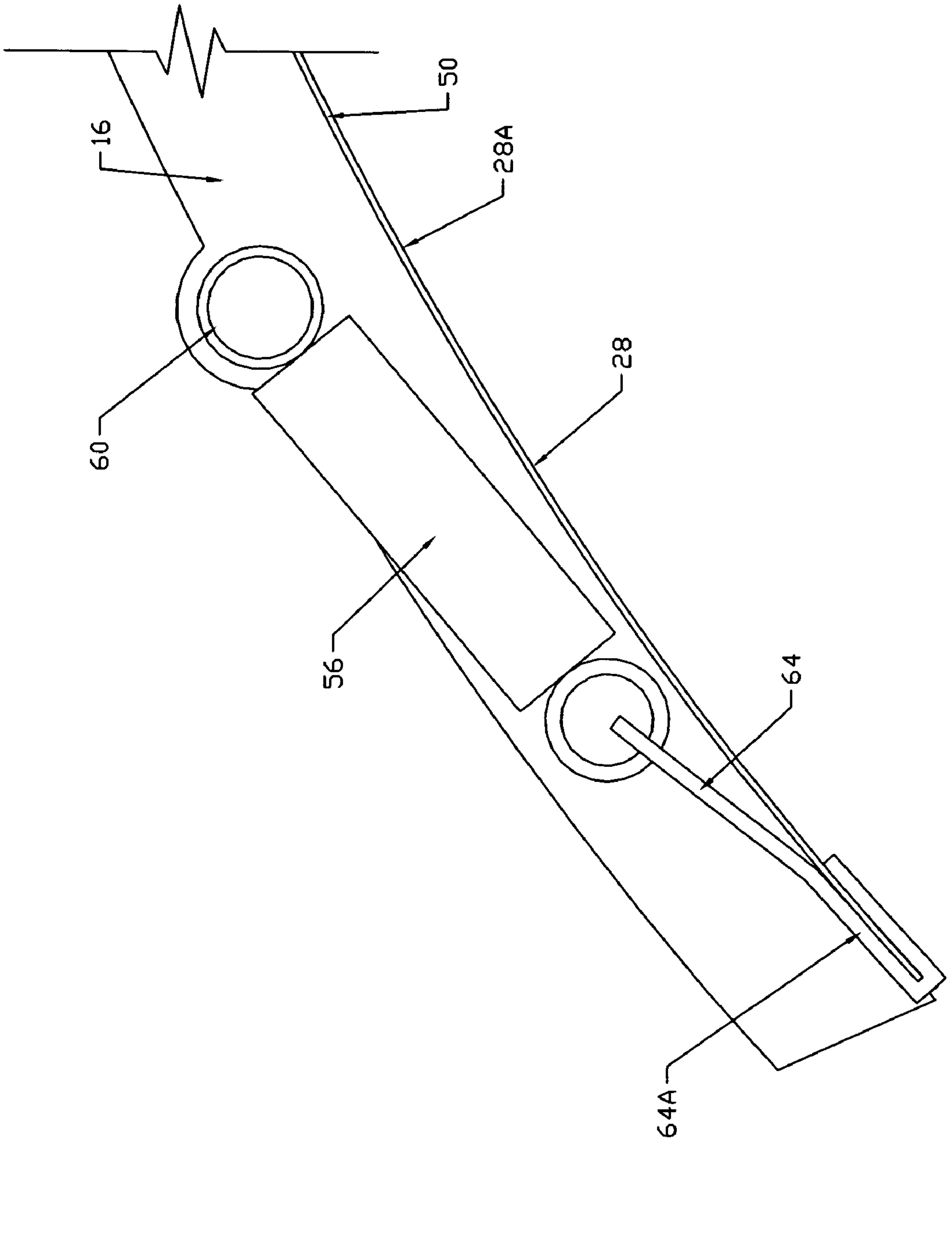
FIG. 7 is a further enlarged depiction of one of the springs and spring clip, looking at the extreme left-hand end of FIG. 6.

Referring to FIG. 7 in conjunction with FIG. 6, the invention contemplates a unique feature which includes spring means to draw reflector sections 28A and 28B into engagement with the concave, contour surfaces 50 of support ribs 16. Specifically, the flexible reflector sections 28A and 28B are fabricated of highly reflective, sheet material, such as sheet metal or the like. As seen in FIG. 6, an inside edge 52 of reflector section 28A abuts against center flanges 44 of support ribs 16, and an inside edge 54 of reflector section 28B abuts against the center flanges of the ribs. A plurality of coil springs 56 for reflector section 28A and coil springs 58 for reflector section 28B are provided to pull the reflector sections into abutment with center flanges 44 of the support ribs and to draw the flexible reflector sections against the concave contour surfaces 50 of the ribs. One end of each coil spring 56 is secured to a spring support rod 60 (see FIG. 2) and one end of each coil spring 58 is secured to a spring support rod 62 (see FIG. 5), with the spring support rods extending through appropriate holes in support ribs 16. Support rods 60 and 62 extend through small holes in support ribs 16. The support rods may be fabricated of metal material and the support ribs may be spot welded thereto. The opposite ends of the coil springs are attached to a plurality of spring clips 64 which embrace the outside edges of reflector sections 28A and 28B. Specifically, spring clips 64 have U-shaped engagement lips 64*a* which wrap around the outside edges of the reflector sections. The spring clips may be stamped and formed of sheet metal material, and individual spring clips are disposed between respective pairs of adjacent support ribs 16 as can be seen in FIGS. 1 and 2. Therefore, coil springs 56 and 58 are effective to pull on the outer edges of reflector sections 28A and 28B, respectively, and to biasingly draw the flexible reflector sections into engagement with the concave contour surfaces defined by support ribs 16.

Figure 8:
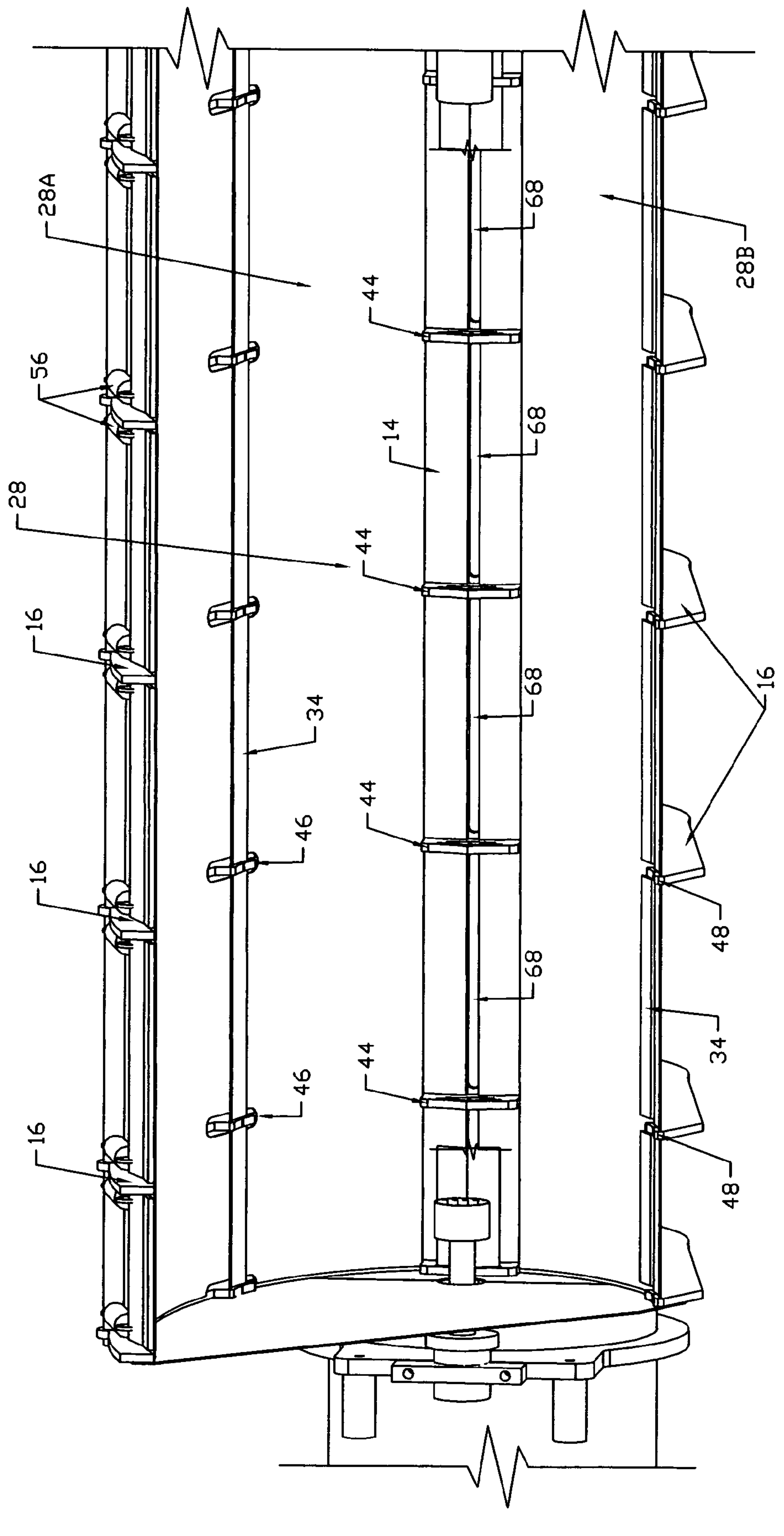
FIG. 8 is a fragmented perspective view looking into one end of the apparatus, with the light source and back reflector cut-away, to illustrate the cooling slots in the elongated support between the support ribs.
Figure 9:
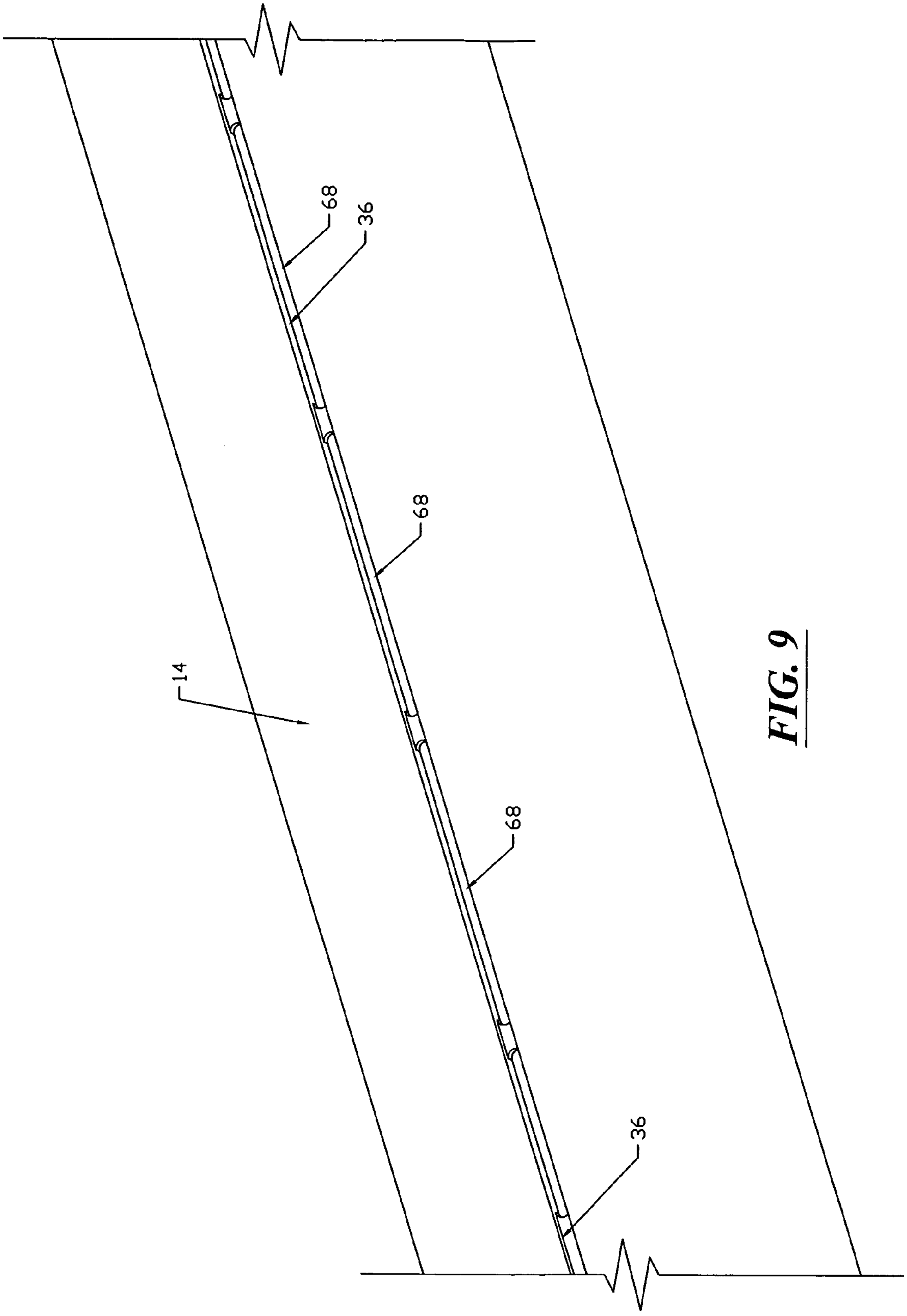
FIG. 9 is an enlarged perspective view of a section of the elongated support to illustrate a plurality of the cooling slots.

FIGS. 8 and 9 show the unique cooling system of the present invention. Specifically, the generally hollow, cylindrical support tube 14 forms a passage entirely therethrough for a cooling medium such as cooling air. The cooling air can be supplied from an appropriate source thereof to an air inlet end 74 (FIG. 2) of the support tube. As best seen in FIGS. 8 and 9, air openings in the form of a plurality of cooling slots 68 are formed in the support tube in communication with the interior passage thereof. It can be seen in FIG. 8 that there are a plurality of discrete cooling slots 68 formed between adjacent pairs of support ribs 16. In other words, one cooling slot 68 is formed between each pair of support ribs. Actually, as best seen in FIG. 9, cooling slots 68 are formed in the bottom or base of positioning groove 36 which receives positioning tabs 38 of the support ribs, as described above.

The advantages of the cooling system of the invention should be appreciated. It can be understood that support tube 14 performs a dual function of supporting support ribs 16 as well as providing a manifold for cooling air which exits the openings or slots 68 toward the interior of reflector 28. FIG. 3 shows a few of the cooling slots 68 which communicate with the interior of the open-sided reflector 28, between the inner edges 52 and 54 of reflector sections 28A and 28B, respectively. The very efficient and streamlined structural combination can easily be visualized in FIG. 2 wherein it can be seen that all of the cumbersome and expensive housings of the prior art have been completely eliminated. As essence, the "support means" for the "reflector means" of the irradiating apparatus of the invention performs both a support function and a cooling function as a manifold for the cooling air.

Figure 10:
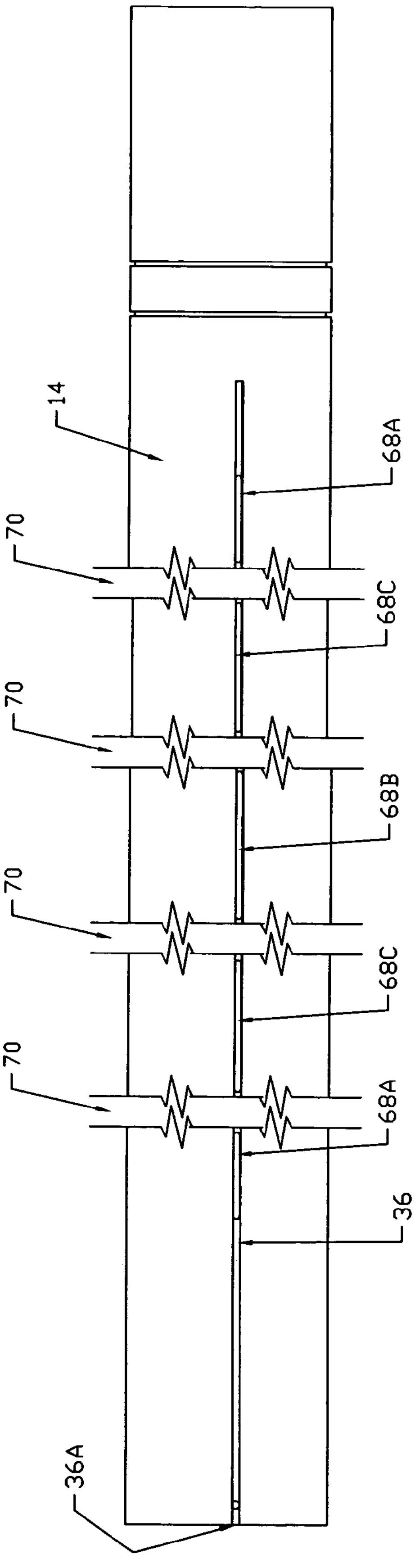
FIG. 10 is a somewhat schematic illustration of the cooling slots increasing in size from opposite ends of the support tube toward the center thereof.
Figure 11:
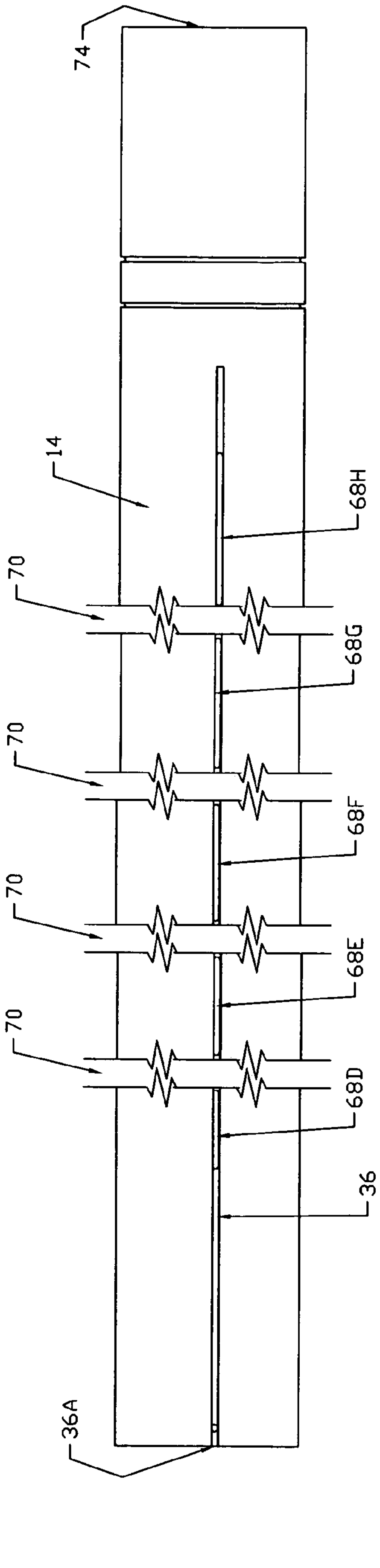
FIG. 11 is a somewhat schematic illustration similar to FIG. 10, but with the cooling slots increasing in size from one end of the support tube to the opposite end thereof.

Finally, FIGS. 10 and 11, although being somewhat schematic illustrations, show how the cooling system of the invention can be advantageously used to vary the flow of cooling air lengthwise along the elongated support tube 14. Specifically, it can be understood that in most irradiating apparatus, light source 24 also is a source of heat. It also can be understood that the heat of such an elongated source might be considerably higher at the center of the apparatus than at the ends of the apparatus where environmental air flow is more prevalent. Therefore, FIG. 10 shows how the end-most cooling slots or air openings 68A are smaller in size than the center cooling slot 68B, with intermediate cooling slots 68*c* of yet different sizes between the endmost and the center slots. The illustration is broken-away, as at 70, lengthwise of support tube 14, but it can be understood that the openings can increase in size progressively from opposite ends of support tube (manifold) 14 toward the center thereof where the heat often is the most intense.

FIG. 11 shows another advantageous scheme wherein a plurality of air openings or slots 68D-68H increase in size from one end 74 of support tube 14 to an opposite closed end thereof. In this schematic illustration, end 74 represents the inlet end of the hollow support tube. Therefore, air openings 68D-68H progressively increase in size toward the inlet end of the tube in order to have a more uniform air flow lengthwise of the tube. Specifically, high velocity air enters tube 14 at inlet end 74 and is stopped at the opposite closed end which increases the static pressure at the closed end. By decreasing the size of air openings 68D-68H toward the high pressure closed end of the tube, a more uniform air flow is provided lengthwise of the tube.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. An apparatus for curing a curable coating on an object, comprising:

an elongated support;

a plurality of ribs supported by the elongated support and spaced longitudinally therealong, the ribs having concave contour surfaces;

a thin elongated, sheet-like reflector independent of the elongated support disposed against the concave contour surfaces of said ribs to define an open-sided light energy reflector surface;

an elongated light source of radiating curing energy generally at the source focal point of the elongated reflector for curing said coating on the object; and said elongated support having passage means for cooling air to flow therethrough, the passage means having opening means for distributing the cooling air along the apparatus, said passage means being defined entirely by the elongated support independently of the elongated reflector;

whereby said elongated support performs a dual function of supporting said ribs as well as providing a manifold for said cooling air.

2. The apparatus of claim 1 wherein said elongated support is generally hollow longitudinally thereof, with said opening means comprises a plurality of air openings in the support spaced longitudinally thereof.

3. The apparatus of claim 2 wherein said elongated support comprises a tube-like member.

4. The apparatus of claim 2 wherein said openings are located between said ribs.

5. The apparatus of claim 4 wherein said openings comprise slots in the elongated support, the slots being elongated in the direction of the elongated support.

6. The apparatus of claim 1 wherein said opening means comprise a plurality of discrete openings in the elongated support spaced longitudinally thereof.

7. The apparatus of claim 6 wherein said openings decrease in size from an air inlet end of the elongated support toward an opposite closed end thereof.

8. The apparatus of claim 6 wherein said openings increase in size from opposite ends of the elongated support toward the center thereof.

9. The apparatus of claim 1 wherein said reflector comprises a reflector sheet, and including spring means to draw the reflector sheet against the contour surfaces of the ribs.

10. The apparatus of claim 9 wherein said spring means comprise a plurality of spring members spaced longitudinally of the apparatus.

11. The apparatus of claim 9 wherein said spring means effectively engage edges of the reflector sheet at longitudinal edges of the open-sided reflector surface.

12. An irradiating apparatus, comprising:

an elongated support means defining a concave contour surface;

an elongated reflector of flexible sheet material disposed against the concave contour surface to define an open-sided light energy reflector surface;

an elongated light source of radiating curing energy generally at the source focal point of the elongated reflector; and spring means to pull the flexible reflector against said concave contour surface.

13. The irradiating apparatus of claim 12 wherein said spring means comprise a plurality of spring members spaced longitudinally of the apparatus.

14. The irradiating apparatus of claim 12 wherein said spring means effectively engage edges of the reflector sheet material at longitudinal edges of the open-sided reflector surface.

15. An irradiating apparatus, comprising:

a support member;

a thin sheet-like reflector independent of and supported by the support member to define a concave light energy reflector surface;

a light source of radiating curing energy generally at the source focal point of the reflector; and said support member having passage means for cooling air to flow therethrough and opening means for distributing the cooling air to the apparatus, said passage means being defined entirely by the support independently of the reflector;

whereby the support member performs a dual function of supporting the reflector as well as providing a manifold for the cooling air.

16. The apparatus of claim 15 wherein said support member is elongated and generally hollow longitudinally thereof, with said opening means comprising a plurality of air openings in the support member spaced longitudinally thereof.

17. The apparatus of claim 16 wherein said support member comprises a support tube.

18. The apparatus of claim 15 wherein said support member is elongated and said opening means comprise slots in the elongated support member, the slots being elongated in the direction of the elongated support member.

19. The apparatus of claim 15 wherein said support member is elongated and said opening means comprise a plurality of discrete openings in the support member spaced longitudinally thereof.

20. The apparatus of claim 19 wherein said openings decrease in size from an air inlet end of the elongated support member toward an opposite closed end thereof.

21. The apparatus of claim 19 wherein said openings increase in size from opposite ends of the elongated support member toward the center thereof.

22. An apparatus for curing a curable coating on an object, comprising:

an elongated support;

a plurality of ribs supported by the elongated support and spaced longitudinally therealong, the ribs having concave contour surfaces;

an elongated reflector disposed against the concave contour surfaces of said ribs to define an open-sided light energy reflector surface;

an elongated light source of radiating curing energy generally at the source focal point of the elongated reflector for curing said coating on the object; and said elongated support having passage means for cooling air to flow therethrough, the passage means having opening means for distributing the cooling air along the apparatus, said passage means being defined entirely by the elongated support independently of the elongated reflector, said opening means comprising a plurality of discrete openings in the elongated support spaced longitudinally thereof, and said openings decreasing in size from an air inlet end of the elongated support toward an opposite closed end thereof;

whereby said elongated support performs a dual function of supporting said ribs as well as providing a manifold for said cooling air.

23. An apparatus for curing a curable coating on an object, comprising:

an elongated support;

a plurality of ribs supported by the elongated support and spaced longitudinally therealong, the ribs having concave contour surfaces;

an elongated reflector disposed against the concave contour surfaces of said ribs to define an open-sided light energy reflector surface;

an elongated light source of radiating curing energy generally at the source focal point of the elongated reflector for curing said coating on the object; and said elongated support having passage means for cooling air to flow therethrough, the passage means having opening means for distributing the cooling air along the apparatus, said passage means being defined entirely by the elongated support independently of the elongated reflector, said opening means comprising a plurality of discrete openings in the elongated support spaced longitudinally thereof, and said openings increasing in size from opposite ends of the elongated support toward the center thereof;

whereby said elongated support performs a dual function of supporting said ribs as well as providing a manifold for said cooling air.

24. An irradiating apparatus, comprising:

a support member;

a reflector supported by the support member to define a concave light energy reflector surface;

a light source of radiating curing energy generally at the source focal point of the reflector; and said support member having passage means for cooling air to flow therethrough and opening means for distributing the cooling air to the apparatus, said passage means being defined entirely by the support independently of the reflector, said support member being elongated and said opening means comprising a plurality of discrete openings in the support member spaced longitudinally thereof, and said openings decreasing in size from an air inlet end of the elongated support member toward an opposite closed end thereof;

whereby the support member performs a dual function of supporting the reflector as well as providing a manifold for the cooling air.

25. An irradiating apparatus, comprising:

a support member;

a reflector supported by the support member to define a concave light energy reflector surface;

a light source of radiating curing energy generally at the source focal point of the reflector; and said support member having passage means for cooling air to flow therethrough and opening means for distributing the cooling air to the apparatus, said passage means being defined entirely by the support independently of the reflector, said support member being elongated and said opening means comprising a plurality of discrete openings in the support member spaced longitudinally thereof, and said openings increasing in size from opposite ends of the elongated support member toward the center thereof;

whereby the support member performs a dual function of supporting the reflector as well as providing a manifold for the cooling air.

* * * * *